(12) United States Patent
Yamauchi

(10) Patent No.: US 7,962,475 B2
(45) Date of Patent: Jun. 14, 2011

(54) INFORMATION PROCESSING APPARATUS FOR SEARCHING FOR A DESIRED IMAGE PROCESSING APPARATUS CONNECTED TO A NETWORK, METHOD FOR CONTROLLING THE SAME, AND COMPUTER-READABLE STORAGE MEDIUM

(75) Inventor: Hisayuki Yamauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 11/249,833

(22) Filed: Oct. 13, 2005

(65) Prior Publication Data

US 2006/0095498 A1 May 4, 2006

(30) Foreign Application Priority Data

Nov. 4, 2004 (JP) .................. 2004-320639

(51) Int. Cl.
*G06F 7/00* (2006.01)
*G06F 17/30* (2006.01)

(52) U.S. Cl. ...................................... 707/718

(58) Field of Classification Search ............... 707/4, 17, 707/1, 10, 3, 5, 999.004, 718; 710/104; 709/219; 715/809
See application file for complete search history.

(56) References Cited

U.S. PATENT DOCUMENTS

| | | | | |
|---|---|---|---|---|
| 748,276 A * | 12/1903 | Chang | ............................. | 72/103 |
| 6,047,340 A * | 4/2000 | Kase et al. | ...................... | 710/60 |
| 6,377,946 B1 * | 4/2002 | Okamoto et al. | .................. | 707/5 |
| 6,560,595 B1 * | 5/2003 | Sanders et al. | ..................... | 707/2 |
| 6,570,571 B1 | 5/2003 | Morozumi | | |
| 6,996,555 B2 * | 2/2006 | Muto et al. | ......................... | 707/3 |
| 7,085,814 B1 * | 8/2006 | Gandhi et al. | ............... | 709/208 |
| 7,127,451 B1 * | 10/2006 | Kimura | ............................. | 707/3 |
| 7,284,013 B2 | 10/2007 | Ochiai et al. | | |
| 2002/0023076 A1 * | 2/2002 | Shishido | ........................... | 707/1 |
| 2002/0165855 A1 * | 11/2002 | Ohtomo | ........................... | 707/3 |
| 2003/0115199 A1 * | 6/2003 | Ochiai et al. | ..................... | 707/10 |
| 2004/0122812 A1 * | 6/2004 | Yoshimura et al. | .............. | 707/3 |
| 2005/0165765 A1 | 7/2005 | Neruse | | |
| 2006/0100998 A1 * | 5/2006 | Edwards et al. | .................. | 707/3 |

FOREIGN PATENT DOCUMENTS

| | | |
|---|---|---|
| CN | 188929 A | 7/1998 |
| CN | 1279440 A | 1/2001 |
| JP | 8-328781 A | 12/1996 |
| JP | 2000-222590 A | 8/2000 |
| JP | 2004-234218 A | 8/2004 |
| WO | WO2004/084095 A1 | 9/2004 |

* cited by examiner

*Primary Examiner* — Mohammad Ali
*Assistant Examiner* — Alexey Shmatov
(74) *Attorney, Agent, or Firm* — Canon USA, Inc. IP Division

(57) ABSTRACT

An apparatus is provided which is adapted to search for a desired device among a plurality of devices in a network. The apparatus includes a dividing unit adapted to divide a search condition into a first search condition and a second search condition when the size of the search condition exceeds a predetermined data size; a transmitting unit adapted to transmit the first search condition and the second search condition; a receiving unit adapted to receive each of a first search result of the first search condition and a second search result of the second search condition; and display unit adapted to display a combined search result on the basis of the first search result and the second search result received by the receiving unit.

9 Claims, 16 Drawing Sheets

FIG. 6

```
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
<env:Body>
<bm:create-job xmlns:bm="urn:schemas-bmlinks-jp:service:bmlinks-1-2">
<requesting-user-name>user1</requesting-user-name>
<job-instruction>
<job-instruction-params>
<job-name>sample-job</job-name>
<optional-attributes-fidelity>false</optional-attributes-fidelity>
<copies>1</copies>
<sides>two-sided-long-edge</sides>
<finishings enc:arrayType="bm:Finishing[1]">
<finishing>staple</finishing>
</finishings>
<document-format>image/tiff</document-format>
</job-instruction-params>
<notification-instruction>
<notification-recipient>http://192.168.1.5/event</notification-recipient>
<events enc:arrayType="bm:Event[2]">
<event>job-completed</event>
<event>job-canceled</event>
</events>
</notification-instruction>
</job-instruction>
</bm:create-job>
</env:Body>
</env:Envelope>
```

FIG. 7

```
<env:Envelope xmlns:env="http://www.w3.org/2001/12/soap-envelope"
 env:encodingStyle="http://www.w3.org/2001/12/soap-encoding"
 xmlns:enc="http://www.w3.org/2001/12/soap-encoding">
  <env:Body>
    <bm:create_jobResponse xmlns:bm="urn:schemas-bmlinks-jp:service:bmlinks-1-2">
      <result-code>ok</result-code>
      <job-id>1</job-id>
      <notification-subscription-id>1</notification-subscription-id>
      <data-sink-uri>
        http://192.168.1.4/job001
      </data-sink-uri>
    </bm:create_jobResponse>
  </env:Body>
</env:Envelope>
```

FIG. 9

POST /job001 HTTP/1.1
Host: Cxxx-Printer
Content-Length: nnn (...data...)

FIG. 10

HTTP/1.1 200 OK
Connection: close

FIG. 11

```
<env:Envelope xmlns:env="http://www.w3.org/2001/12/soap-envelope"
 env:encodingStyle="http://www.w3.org/2001/12/soap-encoding"
 xmlns:enc="http://www.w3.org/2001/12/soap-encoding">
    <env:Body>
        <env:Fault>
            <faultcode>env:Sender</faultcode>
            <faultstring>Sender Error</faultstring>
            <detail>
                <bm:fault-information xmlns:bm="urn:schemas-bmlinks-jp:service:bmlinks-1-2">
                    <result-code>conflicting-attributes</result-code>
                </bm:fault-information>
            </detail>
        </env:Fault>
    </env:Body>
</env:Envelope>
```

FIG. 13A

PRINT SERVICE SEARCH SCREEN

AND  OR  ( )
QUERY EXPRESSION

EXECUTE SEARCH

FIG. 13B

PRINT SERVICE SEARCH SCREEN

1 PAPER SIZE
COLOR/BLACK-AND-WHITE
ONE-SIDED/DUPLEX
3 FINISHING

AND  OR  ( )
QUERY EXPRESSION

EXECUTE SEARCH

FIG. 13C

PRINT SERVICE SEARCH SCREEN

1 PAPER SIZE    A4
                A3
2               B4
3               B3
                Letter
4               Legal
5

AND  OR  ( )
QUERY EXPRESSION

EXECUTE SEARCH

FIG. 13D

PRINT SERVICE SEARCH SCREEN

1 PAPER SIZE    A4
2
3
4
5

AND  OR  ( )
QUERY EXPRESSION
1

EXECUTE SEARCH

FIG. 13E

PRINT SERVICE SEARCH SCREEN

1 PAPER SIZE    A4
2
3
4
5

AND  OR  ( )
QUERY EXPRESSION
1 OR

EXECUTE SEARCH

FIG. 13F

PRINT SERVICE SEARCH SCREEN

1 PAPER SIZE              A4
2 PAPER SIZE              A3
3 COLOR/BLACK-AND-WHITE   COLOR (65536 COLORS)
4 ONE-SIDED/DUPLEX        two-side-short-edge
5 FINISHING               STAPLE

AND  OR  ( )
QUERY EXPRESSION
(1 OR 2) AND 3 AND 4 AND 5

EXECUTE SEARCH

FIG. 14

```
M-SEARCH * HTTP/1.1
Host: 239.255.255.250:1900
MAN: "ssdp:discover"
MX: 5
ST: urn:schemas-bmlinks-jp:service:print:1
RID: uuid:7d0f2c0f-f53d-4353-a2d2-e2c0e5bc798c
Content-Type: text/xml
Content-Length: nnnn <?xml version="1.0" encoding="UTF-8"?>
<bm:scd xmlns:enc="http://www.w3.org/2001/12/soap-encoding"
xmlns:bm="urn:schemas-bmlinks-jp:discovery:bmlinks-1-2">
  <nsList enc:arrayType="nsaT[2]">
    <ns>urn:schemas-upnp-org:service-1-0</ns>
    <ns>urn:schemas-bmlinks-jp:discovery:reserved-1-2</ns>
    <ns>urn:schemas-bmlinks-jp:service-1-2</ns>
  </nsList>
  <flt>
    <com>
      <and enc:arrayType="comT[4]">
        <com>
          <or enc:arrayType="comT[2]">
            <com>
              <itm>
                <cnd>
                  <nod nsid="1">stateVariable</nod>
                  <pre>
                    <exp nsid="1">name</exp>
                    <op>eq</op>
                    <arg>media</arg>
                  </pre>
                </cnd>
                <nod nsid="3">allowedValue</nod>
                <pre>
                  <exp nsid="2">.</exp>
                  <op>eq</op>
                  <arg>iso-a4</arg>
                </pre>
              </itm>
            </com>
            <com>
              <itm>
                <cnd>
                  <nod nsid="1">stateVariable</nod>
                  <pre>
                    <exp nsid="1">name</exp>
                    <op>eq</op>
                    <arg>media</arg>
                  </pre>
                </cnd>
                <nod nsid="3">allowedValue</nod>
                <pre>
                  <exp nsid="2">.</exp>
                  <op>eq</op>
                  <arg>iso-a3</arg>
                </pre>
              </itm>
            </com>
          </or>
        </com>
        <com>
          <itm>
            <cnd>
              <nod nsid="1">stateVariable</nod>
              <pre>
                <exp nsid="1">name</exp>
                <op>eq</op>
                <arg>colors</arg>
              </pre>
            </cnd>
            <nod nsid="3">allowedValue</nod>
            <pre>
              <exp nsid="2">.</exp>
              <op>ge</op>
              <arg>65536</arg>
            </pre>
          </itm>
        </com>
        <com>
          <itm>
            <cnd>
              <nod nsid="1">stateVariable</nod>
              <pre>
                <exp nsid="1">name</exp>
                <op>eq</op>
                <arg>sides</arg>
              </pre>
            </cnd>
            <nod nsid="3">allowedValue</nod>
            <pre>
              <exp nsid="2">.</exp>
              <op>ge</op>
              <arg>two-side-short-edge</arg>
            </pre>
          </itm>
        </com>
        <com>
          <itm>
            <cnd>
              <nod nsid="1">stateVariable</nod>
              <pre>
                <exp nsid="1">name</exp>
                <op>eq</op>
                <arg>finish</arg>
              </pre>
            </cnd>
            <nod nsid="3">allowedValue</nod>
            <pre>
              <exp nsid="2">.</exp>
              <op>ge</op>
              <arg>staple</arg>
            </pre>
          </itm>
        </com>
      </and>
    </com>
  </flt>
</bm:scd>
```

FIG. 15

```
HTTP/1.1 200 OK
Cache-Control: max-age=1800
Date: Wed, 06 Dec 2000 20:08:37 GMT
Location: http://192.168.0.10:1234/bmlinks/print/ddf.xml
BMDC: http://192.168.0.10:1234/bmdc/
EXT:
Server:BMLinkS_OS/2.4 UPnP/1.0 BMLinkS_MFP/1.3
ST: urn:schemas-bmlinks-jp:service:print:1
RID: uuid:7d0f2c0f-f53d-4353-a2d2-e2c0e5bc798c
USN: uuid: 40695093- [...] -69c406626884::urn:schemas-bmlinks-jp:service:print:1
Content-Type: text/xml
Content-Length: nnnn <bm:svcLst xmlns:bm="urn:schemas-bmlinks-jp:discovery:bmlinks-1-2"
xmlns:enc="http://www.w3.org/2001/12/soap/encoding"
enc:arrayType="bm:sdaT[1]">
  <svc>
    <st>urn:schemas-bmlinks-jp:service:print:1</st>
    <loc>http://192.168.0.10:1234/bmlinks/print/ddf.xml</loc>
    <uuid>40695093- [...] -69c406626884</uuid>
  </svc>
</bm:svcLst>
```

FIG. 16

| SEARCH RESULT | | | |
| --- | --- | --- | --- |
| SELECTION | DEVICE NAME | MODEL NAME | IP ADDRESS |
| ✓ | Device3 | iRCXXXX | 172.24.176.10 |

OK

INFORMATION PROCESSING APPARATUS FOR SEARCHING FOR A DESIRED IMAGE PROCESSING APPARATUS CONNECTED TO A NETWORK, METHOD FOR CONTROLLING THE SAME, AND COMPUTER-READABLE STORAGE MEDIUM

BACKGROUND OF THE INVENTION

1. Field of the Invention

The present invention relates to an information processing apparatus for searching for a desired image processing apparatus connected to a network, such as a printer, a method for controlling the information processing apparatus, and a storage medium.

2. Description of the Related Art

In recent years, network technology has been significantly improved in accordance with the widespread use of large-scale networks, such as the Internet. Additionally, a technology known as "Web service" has become widely known in which a variety of network services are provided by cooperation among devices connected via a network using Web related technologies, such as the extended markup language (XML) and the simple object access protocol (SOAP). Among these services, a service known as a print service is provided which receives a print request from a station connected to the network via the network, registers or searches a plurality of printing devices, and causes a printing device having a user's desired function to carry out a print operation.

A device for providing such a print service, namely, a printing device can notify a station in the network of its own device information. Examples of the device information include information associated with the performance of the printing device (e.g., paper size, monochrome/color printing, print output attributes including output resolution, and finishing capability including sorting and stapling) and information associated with the physical location where the printing device is installed (e.g., room A in building AA). By acquiring the device information or searching for the device information, the station in the network can select a printing device having the desired device information from among a plurality of printing devices.

A typical manner in which the station searches for a desired printing device is now herein described. A station attempting to use a service transmits a service search request to the network using a multicast packet of a user datagram protocol (UDP). Since the service search request utilizes a multicast packet, the service search request is transmitted to a plurality of printing devices in the network.

The service search request contains a search condition describing printing device information for a service that the station (i.e., a user) desires. The printing device receives the service search request and determines whether its own device information satisfies the device information of the search condition contained in the service search request.

If the printing device can provide the service that the station (user) which transmitted the service search request desires, that is, if its own device information satisfies the search condition, the printing device sends a reply to the station which transmitted the service search request. In contrast, if the printing device cannot provide the service, that is, if its own device information does not satisfy the search condition, the printing device sends no reply to the station. The reply to the service search request contains a uniform resource locator (URL) indicating the location of the printing device and the device information about the printing device.

Upon receiving the reply to the service search request, the station is informed of the presence of a printing device that can provide the desired service.

However, when the station searches for the desired printing device using this method, a multicast packet using the UDP protocol is used. Accordingly, the size of the service search request is limited to the transmittable size defined for the multicast packet of the UDP protocol. That is, if a search condition in the service search request contains a large number of device information pieces, the multicast packet may not be able to handle such a large amount of specified device information. For example, if an amount of data exceeds 1428 bytes, which is a maximum transmittable data size defined for a multicast packet according to the UDP protocol, the service search request cannot be transmitted to the network. As a result, the desired printing device cannot be searched for.

In an effort to overcome the aforementioned disadvantage inherent to the multicast features of the UDP protocol, another search method has been proposed by Japanese Patent Laid-Open No. 8-328781. Here, instead of transmitting a service search request containing a search expression to a network, a searching device for searching for a service requests device information from all printing devices connected to the network. Subsequently, the searching device receives device information from each of the printing devices. The searching device then displays a list including the name of the printing devices and their device information. A user then selects one of the printing devices displayed and, as a result, the selected device is designated as the device to be used.

However, in the above-described known method, if a large number of devices exist in the network and all of the devices transmit their own device information to the station, the network traffic increases. In addition, the user needs to search for a printing device having the desired attributes from the displayed list. That is, information about devices that are not necessary for the user is unnecessarily displayed in the list.

SUMMARY OF THE INVENTION

The present invention is directed to an information processing apparatus, a method for controlling the same, and a storage medium that can efficiently search for a device having desired device information even when the size of a service search request for searching for the desired device exceeds a predetermined data size.

According to an embodiment of the present invention, an apparatus is provided which is adapted to search for a desired device among a plurality of devices in a network. The apparatus includes a dividing unit adapted to divide a search condition into a first search condition and a second search condition when the size of the search condition exceeds a predetermined data size; a transmitting unit adapted to transmit the first search condition and the second search condition; a receiving unit adapted to receive each of a first search result of the first search condition and a second search result of the second search condition; and display unit adapted to display a combined search result on the basis of the first search result and the second search result received by the receiving unit.

According to another embodiment of the present invention, an apparatus is provided which includes an input unit adapted to input a first search element and a second search element indicating device information from a user; a transmitting unit adapted to transmit a first search condition including the first search element and a second search condition including the second search element when the size of a search condition including the first search element and the second search element exceeds a predetermined data size; a receiving unit adapted to receive each of a first search result of the first search condition and a second search result of the second search condition; and display unit adapted to display a combined search result on the basis of the first search result and the second search result received by the receiving unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 6 provides an example of a "CreateJob" packet data.

FIG. 7 provides an example of reply packet data in response to a CreateJob packet.

FIG. 9 provides an example of a print data transfer packet using the "POST" method of the HTTP.

FIG. 10 provides an example of an HTTP response packet transmitted by the printing device when printing is completed.

FIG. 11 provides an example of an error response data when the CreateJob packet has an error.

FIGS. 13A-13F illustrate examples of search expression input screens of the computer.

FIG. 14 provides an example of service search request packet data.

FIG. 15 provides an example of service search request reply packet data.

FIG. 16 provides an example of a search result display screen.

DESCRIPTION OF THE EMBODIMENTS

Several embodiments and numerous aspects of the present invention are described in detail with reference to the accompanying drawings.

Figure 1:
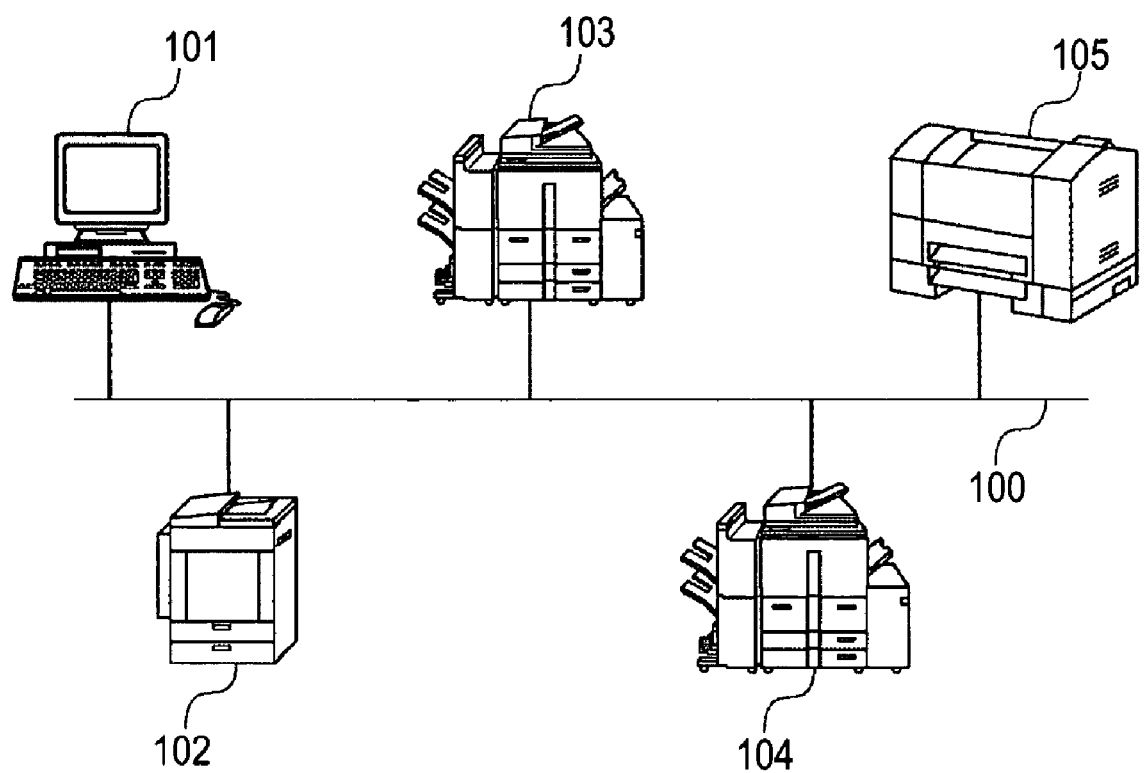
FIG. 1 is a network diagram illustrating the configuration of a service search and printing system according to an embodiment of the present invention.

FIG. 1 illustrates an exemplary network configuration for searching for a service according to an embodiment of the present invention. The network configuration may include a computer (information processing apparatus) 101 for searching for a service, and various printing devices (image forming apparatuses) 102, 103, 104, and 105, which are service providing apparatuses. The computer 101 and the printing devices 102 through 105 are connected to each other via a network 100 so that the computer 101 and the printing devices 102 through 105 can communicate data with each other. That is, the computer 101 and the printing devices 102 through 105 are network-oriented devices. Although only the computer 101 is shown here, a plurality of computers may be connected to the network.

In this embodiment, a printing device for providing a printing service is described as an example of a service providing device. However, the provided service may be another service (e.g., a scan service and a storage service) and the service providing device may be, for example, a scanner, a copier, a facsimile, a multi-function peripheral, a file server or the like. In such a case, the present invention can also be achieved by the same process as described below. Although a service search from a computer to a service providing device is described in this embodiment, it should be understood that the service providing device can carry out the service search according to the present invention.

Figure 2:
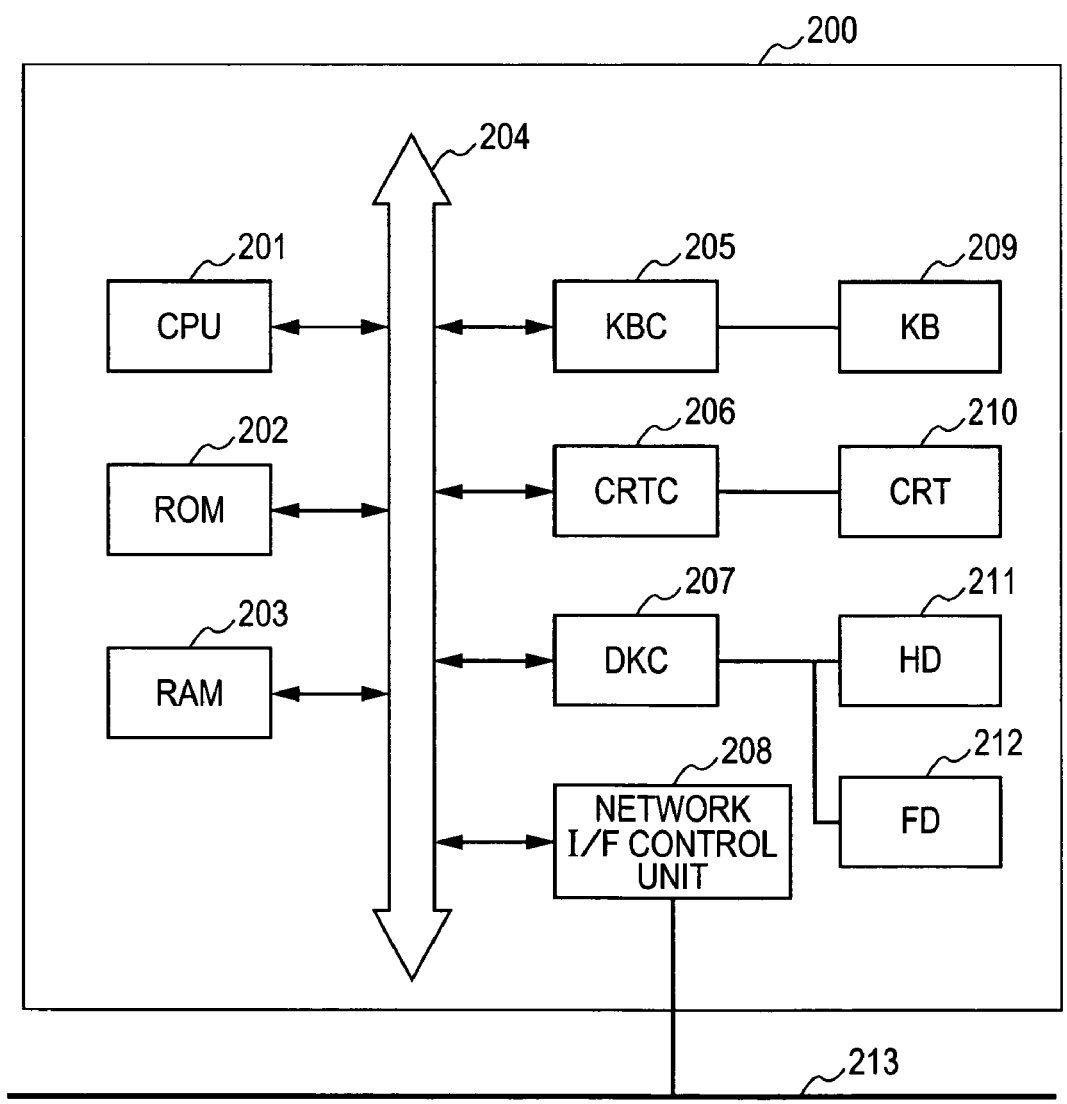
FIG. 2 is a block diagram of an exemplary hardware configuration of a computer.

FIG. 2 is a block diagram of an exemplary hardware configuration of a widely used computer. A personal computer (PC) 200 shown in FIG. 2 is similar to the computer 101 shown in FIG. 1. The PC 200 includes a central processing unit (CPU) 201, which executes a program stored in a read only memory (ROM) 202, a hard disk (HD) 211, or a floppy disk drive (FD) 212. The CPU 201 performs overall control of the devices connected to a system bus 204 to realize each means in this embodiment. A random access memory (RAM) 203 serves as a main memory and a work area of the CPU 201. A keyboard controller (KBC) 205 controls input from a keyboard (KB) 209 and a pointing device, such as a mouse (not shown).

A CRT controller (CRTC) 206 controls the display of a CRT display (CRT) 210. A disk controller (DKC) 207 controls the access to the HD 211 and the FD 212, both of which store a boot program, an application program, a variety of files, and network control programs. As used herein, the term "boot program" refers to a program that starts the execution (operation) of the hardware and software of a personal computer. A network interface (I/F) control unit 208 bi-directionally communicates data to other network devices including a printing device via a local area network (LAN) 213. In this embodiment, the LAN 213 is similar to the network 100 shown in FIG. 1.

Figure 3:
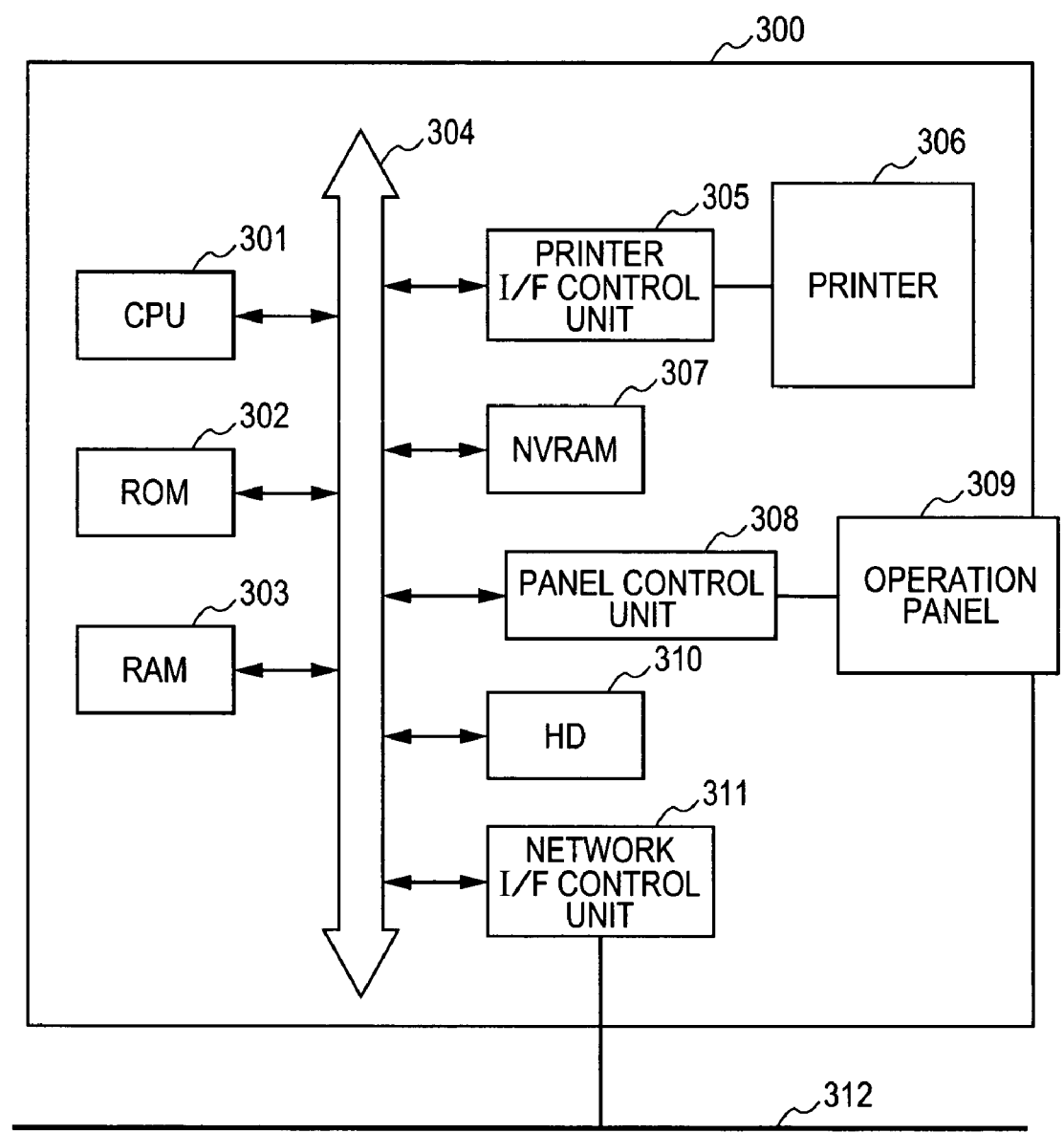
FIG. 3 is a block diagram of an exemplary hardware configuration of a printing device.

FIG. 3 is a block diagram of an exemplary hardware configuration of a printing device, which is a service providing device according to this embodiment of the present invention. A printing device 300 is similar to the printing devices 102 through 105 shown in FIG. 1. The printing device 300 includes a CPU 301 which executes a program stored in a ROM 302 or a hard disk 310. The CPU 301 also performs overall control of the devices connected to a system bus 304 to realize each feature in this embodiment. A RAM 303 serves as a main memory and a work area of the CPU 301. A printer I/F control unit 305 controls a printer 306. A program stored in the CPU 301, the ROM 302, and the hard disk 310 of the printing device 300 realizes each feature of this embodiment. A nonvolatile memory (NVRAM) 307 stores a variety of setting values of the printing device. A panel control unit 308 controls an operation panel 309 to display various information and receive an operational input from a user. A network I/F control unit 311 controls the transmission and reception of data via a LAN 312. In this embodiment, the LAN 312 is similar to the network 100 shown in FIG. 1.

Figure 4:
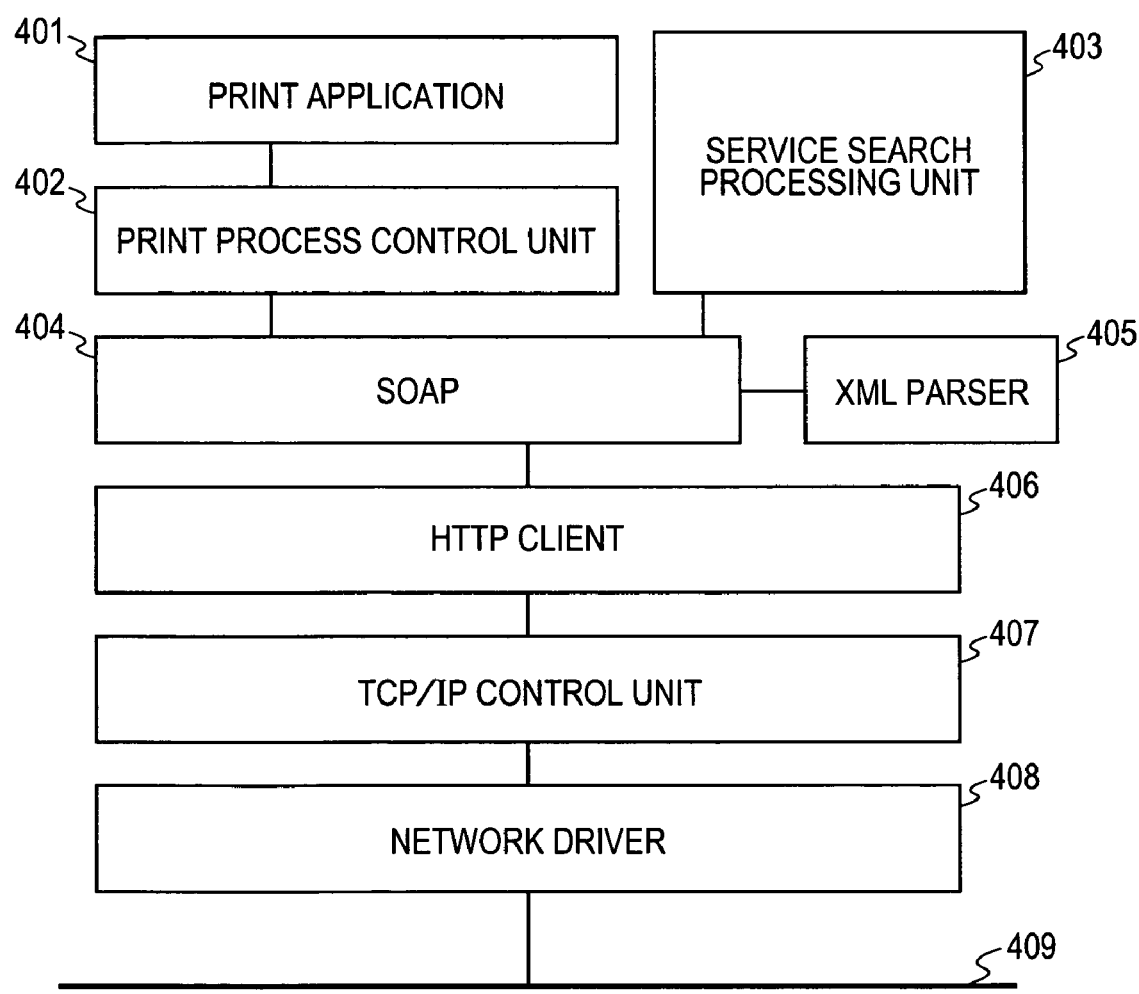
FIG. 4 is a block diagram of an exemplary software configuration of a computer.

FIG. 4 is a block diagram of an exemplary software configuration of the PC 200 according to this embodiment of the present invention. A print application 401 is an application program for executing a print operation in response to an operational input from a user. The print application 401 delivers print data to a print process control unit 402. The print process control unit 402 converts the received data to printable data and carries out a variety of operations associated with printing (e.g., print copy processing and duplex printing). A service search processing unit 403 is a module for searching for a service according to the present embodiment. The service search processing unit 403 carries out a variety of search operations.

A network driver 408 controls the network I/F control unit 208 shown in FIG. 2 to communicate data to and from a network 409. A TCP/IP control unit 407 controls and communicates data with a protocol of the network and transport layers. For example, the TCP/IP control unit 407 controls and communicates data using the TCP and UDP protocols. An HTTP client 406 has a client function defined by the HTTP protocol and transmits an HTTP request packet to the printing device in response to the instruction from the higher-layer application. Additionally, the HTTP client 406 analyzes an HTTP response packet returned from the printing device to deliver the data to the higher-layer application, such as a SOAP control unit 404, the service search processing unit 403, and the print process control unit 402.

The SOAP control unit 404 is a module to control a protocol known as the SOAP (simple object access protocol). The SOAP control unit 404 analyzes data in the XML (extensible markup language) format received from the printing device using a XML parser 405. The SOAP control unit 404 also calls an appropriate module of the print process control unit 402. Additionally, the SOAP control unit 404 delivers data transmitted from the printing device to the service search processing unit 403 (e.g., a service search reply). Furthermore, the SOAP control unit 404 converts data to be returned to the printing device to XML data and returns the XML data to the printing device via an HTTP server control unit 506 shown in FIG. 5. The XML parser 405 is a module for receiving XML data to analyze and outputting the analysis result.

Figure 5:
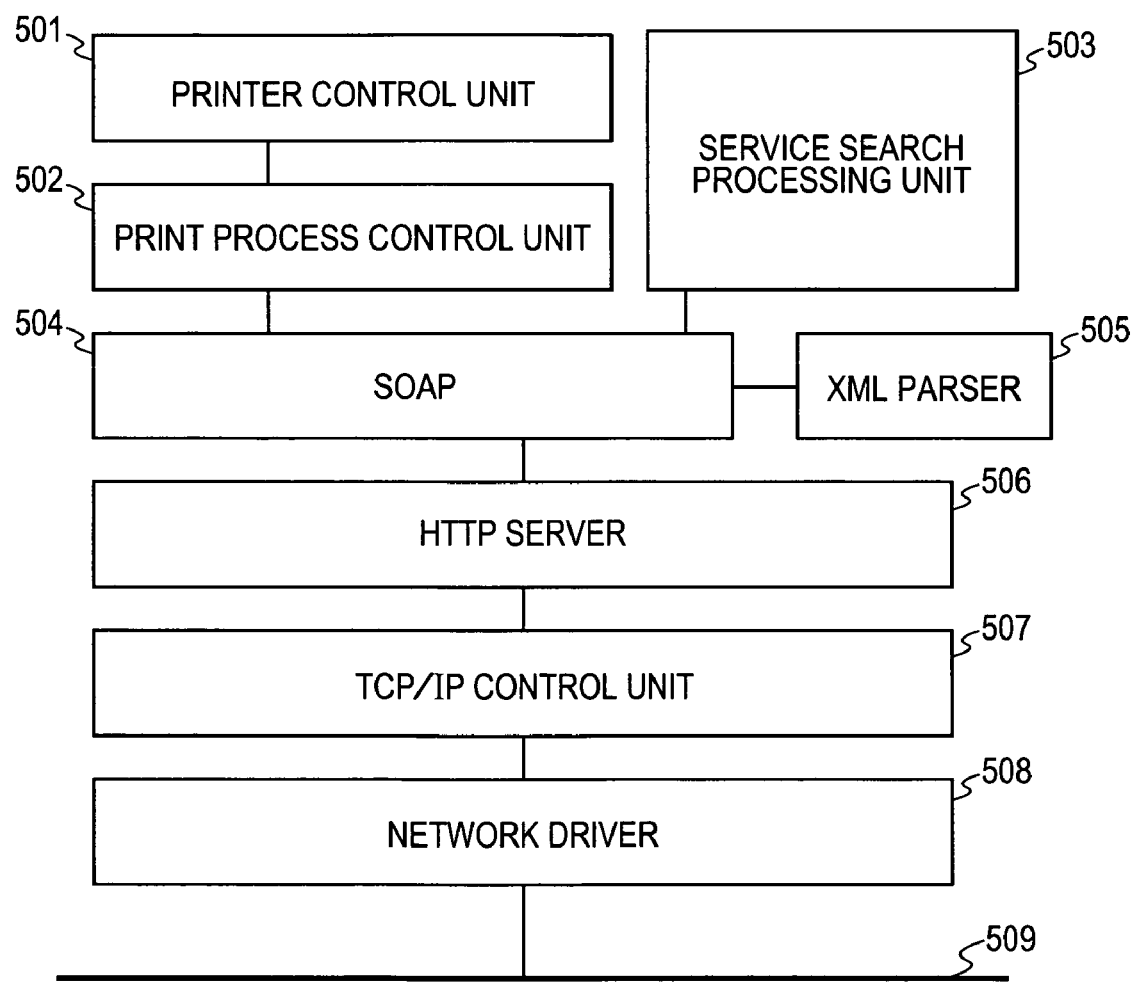
FIG. 5 is a block diagram of an exemplary software configuration of the printing device.

FIG. 5 is a block diagram of an exemplary software configuration of the printing device 300 according to this embodiment of the present invention. A printer control unit 501 controls the printer I/F control unit 305 shown in FIG. 3 to transmit data to the printer 306 shown in FIG. 3 and to control the paper output of the printer 306. A print process control unit 502 converts received data to printable data and controls a variety of operations associated with printing (e.g., print copy processing and duplex printing). A service search processing unit 503 is a module for searching for a service according to the present embodiment. The service search processing unit 503 carries out a variety of searching operations. A network driver 508 controls the network I/F control unit 311 shown in FIG. 3 to communicate data to and from a network 509.

A TCP/IP control unit 507 controls and communicates data with a protocol of the network and transport layers. For example, the TCP/IP control unit 507 controls and communicates data with the TCP and UDP protocols. An HTTP server 506 has a server function defined by the HTTP protocol and analyzes an HTTP request packet received from a computer to deliver the data to the higher-layer application, such as a SOAP control unit 504, the service search processing unit 503, and the print process control unit 502. Additionally, the HTTP server 506 returns an HTTP response packet to the computer in response to an instruction from the higher-layer application.

The SOAP control unit 504 is a module to control the SOAP protocol. The SOAP control unit 504 analyzes data in the XML format received from the computer using a XML parser 505. The SOAP control unit 504 also calls an appropriate module of the print process control unit 502. Additionally, the SOAP control unit 504 delivers data transmitted from a computer to the service search processing unit 503 (e.g., a service search request). Furthermore, the SOAP control unit 504 converts data to be returned to the computer to XML data and returns the XML data to the computer via the HTTP server 506. The XML parser 505 is a module for receiving XML data to analyze it and outputting the analysis result.

The data communication between the computer and the printing device according to this embodiment is described when the computer carries out a print operation using the printing device.

FIG. 6 illustrates an example of packet data referred to as "Createjob", which is transmitted from the computer to the printing device using the SOAP over the HTTP according to the present embodiment. This data is written in the XML format. The CreateJob packet is a command to instruct the printing device to start a job (printing). The CreateJob packet contains information, such as the user name of a requester (<requesting-user-name> tag) and instructions associated with job processing (<job-instruction> tag). The <job-instruction> tag includes a <copies> tag for setting the number of print copies, a <sides> tag for setting duplex printing, and a <finishing> tag for setting a finishing process. The printing device carries out a print operation on the basis of the values set in the tags. Additionally, the <job-instruction> tag can include a <notification-instruction> tag as an option. The <notification-instruction> tag includes notification information about a job. The notification information includes a <notification-recipient> tag for setting the recipient and a <event> tag for setting notification conditions. The printing device carries out an event transmission process on the basis of the values set in these tags.

In the example of the CreateJob packet shown in FIG. 6, the following information is written: a user 1 transmits a print job "sample-job" in which the job is printed in a duplex mode, finished by stapling, and is in the TIFF format; and the job requests an event notification when the job is completed or if the job is canceled.

FIG. 7 illustrates an example of reply packet data generated by the printing device in response to the CreateJob packet shown in FIG. 6. Like the CreateJob packet, this data is written in the XML format. In this embodiment, this data is transmitted and received using the SOAP over the HTTP. The reply packet contains a result code for the CreateJob command (a <result-code> tag), a generated job identifier (a <job-id> tag), and a URI for a print port (a <data-sink-uri> tag).

In the example of the reply packet shown in FIG. 7, the following information is written: the printing device has the requested functions (i.e., duplex printing and stapling); and the printing device transmits the job specified by the Createjob command shown in FIG. 6 to the destination specified by the <data-sink-uri> tag.

Figure 8:
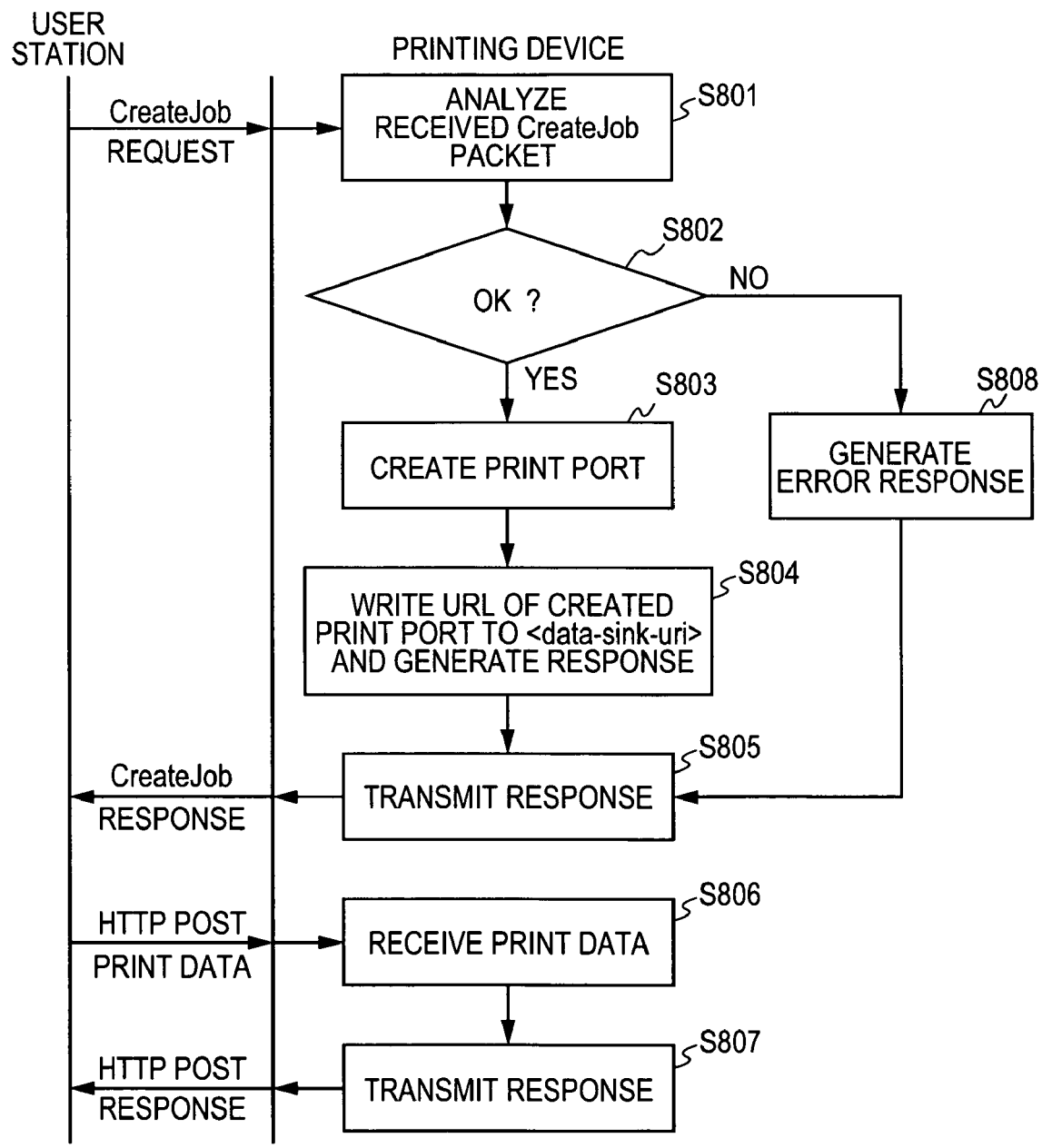
FIG. 8 illustrates a flow chart of an exemplary operation of the printing device when printing is performed.

FIG. 8 illustrates a sequence diagram of exemplary data communication between the computer and the printing device and a flow chart of an exemplary operation of the printing device when the computer carries out a print operation using the printing device. When the computer transmits, for example, a CreateJob packet shown in FIG. 6 to the printing device, the printing device, at step S801, analyzes the XML data in the CreateJob packet. The process then proceeds to step S802, where the printing device determines whether an error is found in the analysis result, that is, the printing device determines whether, for example, duplex printing and stapling are available.

If no error is found, the printing device, at step S803, generates a print port for receiving print data. After the process at step S803 is completed, the process proceeds to step S804, where the printing device generates XML data in response to the CreateJob packet. At that time, the printing device sets the URI of the port generated in order to receive print data at step S803 to the <data-sink-uri> tag. For example, the URI shown in FIG. 7 is embedded in the XML data. After the CreateJob response data is generated, the process proceeds to step S805, where the CreateJob response data is transmitted to the computer using the SOAP. Thereafter, the computer transmits print data to the URI specified by the <data-sink-uri> tag using the POST method of the HTTP.

FIG. 9 illustrates an example of a print data transfer packet using the POST method of the HTTP. At step S806, the printing device receives the data arrived at the print port and prints the data while appropriately processing the data. After all the print data are normally received at step S806, the printing device, at step S807, transmits an HTTP response packet shown in FIG. 10 to the computer and deletes (closes) the print port. Thus, the print operation is completed.

In contrast, if it is determined at step S802 that the XML data written to the CreateJob packet has an error, the process proceeds to step S808, where an error response data is generated. FIG. 11 illustrates an example of the error response data. Subsequently, at step S805, the printing device transmits the error response data to the computer. Thus, the computer does not transfer the print data. The process is then completed.

As can be seen from the foregoing description with reference to FIGS. 6 through 11, in this embodiment, the computer transmits the CreateJob packet to the printing device before starting a print operation and subsequently determines whether the printing device can carry out the print operation to be requested. The computer transfers the print data after the determination. Thus, the computer can reliably carry out the desired print operation. In addition, since the printing device opens the port for receiving the print data in response to the reception of the CreateJob packet, the printing device can reliably receive the print data from the computer.

To realize such a print operation, the computer (user) needs to select a printing device (i.e., a printing device to be used), which is a recipient of the CreateJob packet, from among a plurality of printing devices in the network. That is, the above-described printing operation shown in FIGS. 6 through 11 is an operation between the computer and the printing device after the printing device to be used is selected. The operation between the computer and the printing device is described below with reference to FIGS. 12 through 17 when the computer (user) searches for the desired printing device from among a plurality of printing devices in the network to select the printing device to be used.

Figure 12:
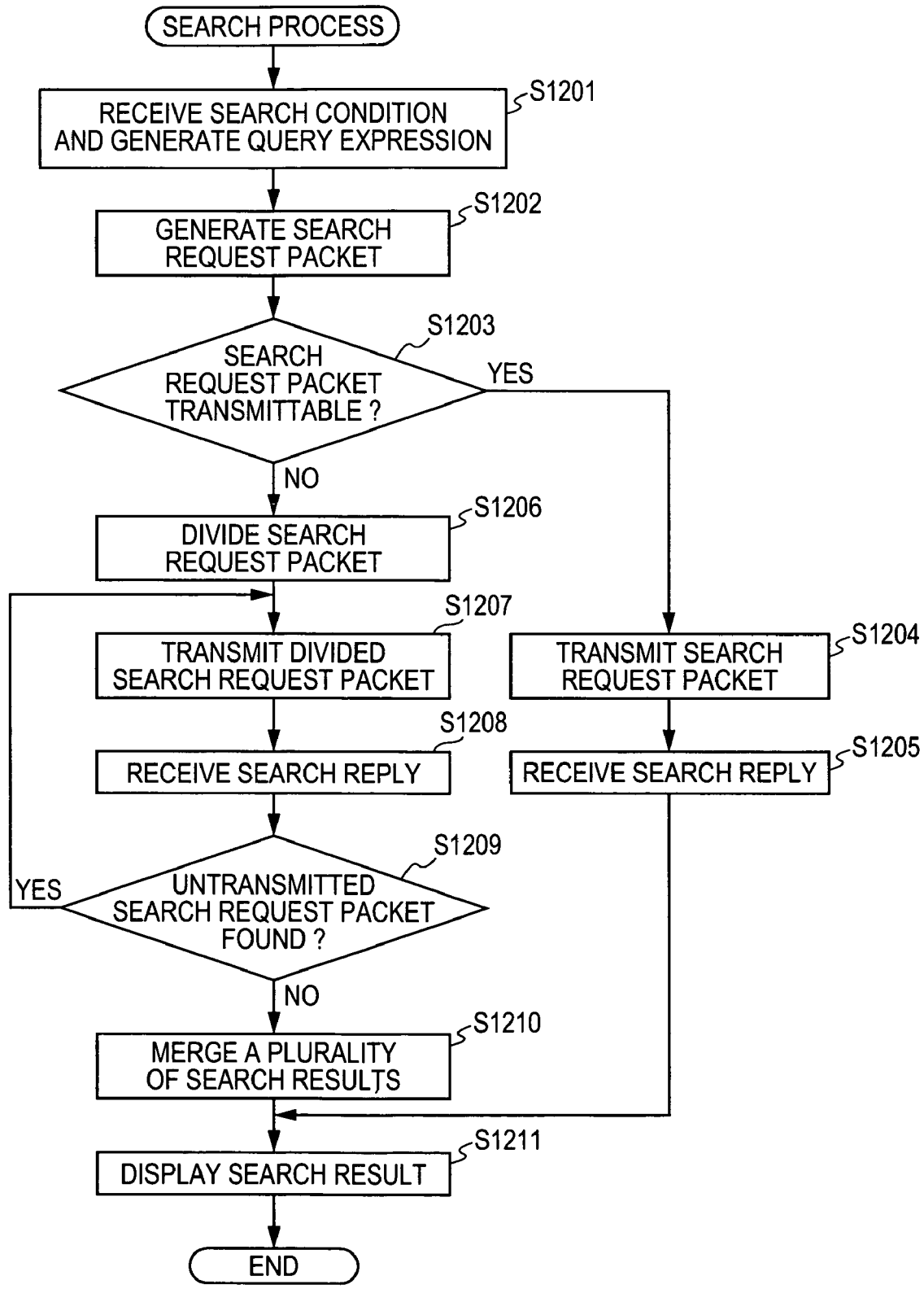
FIG. 12 is a flow chart of an exemplary service search operation of the computer.

FIG. 12 is a flow chart of an exemplary operation of the computer according to this embodiment when the computer searches for a service. The operation shown by the flow chart is realized by the CPU reading out of a program stored in a predetermined storage device, such as the HD, ROM, and FD of the computer, and executing the program. The computer according to this embodiment is similar to computer shown in FIG. 1, and the printing device according to this embodiment may be one of the printing devices 102 through 105 shown in FIG. 1.

At step S1201, the computer receives a search condition for searching for device information that a user desires. The user operation for inputting the search condition at step S1201 is described below with reference to FIGS. 13A-F. An operation screen for inputting the search condition is displayed on a display unit (e.g., the CRT 210) of the computer (see FIG. 13A). Using a pointing device (e.g., a mouse), the user selects a device information item, which is one of a plurality of search conditions, from a pull-down menu (see FIG. 13B). In the example shown in FIG. 13B, since the menu item "paper size" is displayed with its black and white portions reversed, the user realizes that the menu item "paper size" is selected as one of the device information items of the search condition. Subsequently, the user selects a device information option (search condition value) of the device information menu item selected in FIG. 13B from a pull-down menu shown at the right (see FIG. 13C). In the example shown in FIG. 13C, the option "A4" is selected as device information for the device information item "paper size". In the case of generating a search expression, when a search item number button displayed on the left side of the screen is depressed, a search item number appears in a search expression field displayed on the lower side of the screen (see FIG. 13D). Subsequently, by depressing an operator button displayed in the middle of the screen, the selected operator is appended to the search expression (see FIG. 13E). By repeating this operation, a search expression including a plurality of search conditions (i.e., device information; and one search condition is allowed) is generated.

When a query execution button displayed at the lower right of the screen is depressed (see FIG. 13F), the process proceeds to step S1202. Thus, the user can generate the search condition to search for a printing device having the device information that the user desires.

In the following description, the search expression shown in FIG. 13F is used as an example of the search condition for a service search request. In particular, the exemplary search expression shown in FIG. 13F is used for searching for a printing device that supports A4 or A3 as a paper size, a color printing with 65536 colors, duplex printing as a printing method, and staple finishing. This search expression is expressed as follows:

Search expression=[(paper size: [A4 OR A3]) AND
  (color printing: more than or equal to 65536 colors) AND (printing method: duplex) AND (finishing: staple)]

FIG. 14 illustrates an example of service search request packet data when the search expression shown in FIG. 13F is input by a user. In this embodiment, the service search request packet is transmitted as an HTTP multicast packet from a computer that desires to search for to a plurality of printing devices in a network using the UDP protocol. The HTTP header of the service search request packet contains a multicast destination address of, for example, "239.255.255.250" and a destination port of 1900. In this embodiment, each of the printing devices assigns the port of 1900 thereof to a port for searching for a service so that the printing device can receive the service search request packet.

The search expression shown in FIG. 13F and input by a user is written to a body section of the HTTP in the XML format. As described above, the service search request packet represents a search request for a print service that supports A4 or A3 as a paper size, color printing with 65536 colors, duplex printing as a printing method, and staple finishing. This search expression can be expressed as follows:

Search expression=[(paper size: [A4 OR A3]) AND
  (color printing: more than or equal to 65536 colors) AND (printing method: duplex) AND (finishing: staple)]

The <and> tag shown in FIG. 14 indicates the number of "AND" elements in the search expression. Similarly, the <or> tag shown in FIG. 14 indicates the number of "OR" elements in the search expression. Each search element of the search expression is written in a field between <com> tags in a field between <and> tags or between <or> tags.

For example, in terms of the paper size, "media" that represents an attribute of the paper size is written in a field between <cnd> tags. Under the "media", "iso-a4" that indicates an A4 size and "iso-a3" that indicates an A3 size are stored in respective fields between <pre> tags that represent the element value of the "media".

In terms of the color printing, "color" that represents an attribute of the color printing is written in a field between <cnd> tags. Under the "color", "65536" that indicates the number of colors is stored in a field between <pre> tags that represent the element value of the "color".

In terms of the printing method, "sides" that represents an attribute of the printing method is written in a field between <cnd> tags. Under the "sides", "two-sided-short-edge" that indicates duplex printing is stored in a field between <pre> tags that represent the element value of the "sides".

In terms of the finishing, "finishing" that represents an attribute of the printing method is written in a field between <cnd> tags. Under the "finishing", "staple" that indicates stapling is stored in a field between <pre> tags that represent the element value of the "finishing".

Referring back to FIG. 12, the description continues. Upon receiving a request to search for a printing device, the process proceeds to step S1202. At step S1202, the computer generates a service search request packet including the search condition input from the user at step S1201. Subsequently, a search process based on the generated service search request packet is carried out.

At step S1203, it is determined whether the size of the service search request packet generated at step S1202 exceeds the maximum transmittable data size of an HTTP multicast packet using the UDP protocol (i.e., 1428 bytes). That is, it is determined whether the generated service search request packet can be transmitted by the HTTP multicast using the UDP protocol.

If it is determined that the size of the generated service search request packet does not exceed the maximum data size and the generated service search request packet can be transmitted, the process proceeds to step S1204. At step S1204, the service search request packet is transmitted to the network. Thereafter, the process proceeds to step S1205. At step S1205, the computer receives the reply to the service search request packet from a printing device in the network.

FIG. 15 illustrates an example of service search request reply packet data transmitted from the printing device. According to this embodiment, the service search request reply packet is transmitted to the computer that transmitted the service search request packet by the HTTP unicast using the UDP protocol. The service search request packet according to this embodiment contains information about the location of the printing device that can provide the service (i.e., URI in <loc> tag). Like the service search request packet shown in FIG. 14, this information is written in an HTTP body section in the XML format.

In this embodiment, the printing device that provides a service determines whether it can provide the service that the computer desires by comparing the search conditions contained in the service search request shown in FIG. 14 and transmitted from the computer to its own device information. Subsequently, if the printing device can provide the service that the computer desires, that is, if the device information of the printing device satisfies the search conditions, the printing device transmits the service search reply. If the printing device cannot provide the service that the computer desires, the printing device transmits no reply. Consequently, upon receiving the service search reply from the printing device, the computer is informed of the presence of the printing device that can provide the desired service.

If it is determined at step S1203 that the size of the service search request packet generated at step S1202 exceeds the maximum data size and the service search request packet cannot be transmitted, the process proceeds to step S1206. At step S1206, the computer divides the service search request packet into smaller pieces. In particular, the computer divides search elements in the service search request packet and combines the divided elements again so that the service search request packet is divided into a plurality of service search request packets, each of which has a transmittable size.

For example, the above-described search expression is divided into search expressions 1 and 2 as follows:

> Search expression=[(paper size: [A4 OR A3]) AND (color printing: more than or equal to 65536 colors) AND (printing method: duplex) AND (finishing: staple)]

> Search expressions 1=[(paper size: [A4 OR A3]) AND (color printing: more than or equal to 65536 colors)]

> Search expressions 2=[(printing method: duplex) AND (finishing: staple)]

Like the service search request packet shown in FIG. 14, the search expressions 1 and 2 are written in the XML format.

After the service search request packet is divided at step S1206, the process proceeds to step S1207. At step S1207, one of the divided service search request packets is transmitted by the HTTP multicast using the UDP protocol. At step S1208, the computer receives a service search reply to the transmitted service search request packet. However, if no printing device that satisfies the search conditions in the service search request exists in the network, the computer receives no reply. In this case, when a predetermined time has elapsed, the process proceeds to the subsequent step.

At step S1209, the computer determines whether a divided service search request packet that has not been transmitted is found. If an untransmitted divided service search request packet is found, steps 1207 through 1209 are repeated. In this embodiment, since the service search request packet is divided into two packets, the above-described process is repeated twice. After the transmission of all the service search request packets and the reception of all the service search request reply packets are completed, the process proceeds to step S1210, where the replies for all the service search requests are merged.

An example of the merge operation of the search results at step S1210 according to this embodiment is described next. The computer 101 shown in FIG. 1 transmits service search request packets of the above-described search expressions 1 and 2. The printing devices 102 and 103 transmit the service search replies of the format shown in FIG. 15 in response to the search expression 1. The printing devices 103 and 104 transmit the service search replies of the format shown in FIG. 15 in response to the search expression 2. The relationship between the search expressions 1 and 2 is derived from the search expression before it is divided as follows: [search expressions 1 AND search expressions 2]. Accordingly, the computer determines that the printing device 103 that satisfies both search expressions 1 and 2 satisfies the search expression before it is divided, namely, the search expression "(paper size: [A4 OR A3]) AND (color printing: more than or equal to 65536 colors) AND (printing method: duplex) AND (finishing: staple)".

As a result, the process proceeds to step S1211. At step S1211, the computer displays the search result display screen shown in FIG. 16 on the display unit (e.g., the CRT 210). In the example shown in FIG. 16, one printing device is shown as the search result. However, if a plurality of printing devices that satisfy the search condition are found, the plurality of printing devices are displayed in a list shown in FIG. 16. In this embodiment, when a user checks a check box displayed at the left or the screen and depresses an "OK" button displayed at the lower right of the screen, the selected printing device is appended to an available printing device list of a print application. Thus, printing can be executed using the selected printing device. The subsequent print operations are the same as the operations described with reference to FIGS. 6 through 11.

In the search result display screen shown in FIG. 16, the device name, the model name, and IP address are displayed. However, other information associated with the printing devices may be displayed. For example, the similarity between the device information and the search conditions or a physically installed location of the printing device may be displayed. This display facilitates the selection of the printing device (e.g., a printing device having many functions or a printing device located near the computer) when a plurality of printing devices are found. Additionally, the printing devices may be displayed after the printing devices in the list are sorted by the similarity of the search conditions, the distance from the computer, or history information whether the printing device has been used before or not.

The process of dividing the service search request packet carried out at step S1206 in FIG. 12 is described in more detail with reference to FIG. 17 using an example in which a user inputs the above-described search expression "(paper size: [A4 OR A3]) AND (color printing: more than or equal to 65536 colors) AND (printing method: duplex) AND (finishing: staple)".

At step S1701, one search element is removed from the search expression, which is contained in the service search request packet. Thereafter, a search expression is generated again. In the exemplary embodiment, the last search element in the search expression (finishing: staple) is removed. Therefore, the new search expression is:

search expression 3=[(paper size: [A4 OR A3]) AND (color printing: more than or equal to 65536 colors) AND (printing method: duplex)].

At step S1702, a service search request packet is generated from the search expression 3. At step S1703, it is determined whether the size of this service search request packet exceeds the maximum transmittable data size of an HTTP multicast packet using the UDP protocol. If the generated service search request packet can be transmitted, the process proceeds to step S1704. If the service search request packet cannot be transmitted, the process returns to step S1701, where this operation is repeated until the size of this service search request packet becomes the transmittable size.

In the exemplary embodiment, at step S1702, the size of the service search request packet still exceeds the maximum transmittable data size. Accordingly, after the determination is made at step S1703, the process returns to step S1701, where the last search element in the search expression (printing method: duplex) is removed. Therefore, the new search expression is:

search expression 4=[(paper size: [A4 OR A3]) AND (color printing: more than or equal to 65536 colors)].

At step S1702, a service search request packet is generated from the search expression 4 again. Since the size of the service search request packet is less than or equal to the maximum transmittable data size, it is determined at step S1703 that the service search request packet can be transmitted. The service search request packet is considered to be a first service search request packet and the process proceeds to step S1704.

At step S1704, a new search expression is generated from the search element removed from the search expression at step S1701. At step S1705, a service search request packet is generated. At step S1706, it is determined whether the size of this service search request packet exceeds the maximum transmittable data size of an HTTP multicast packet using the UDP protocol. If it is determined that the size of the service search request packet is the transmittable size, the service search request packet is considered to be a second service search request packet and the process is completed.

If it is determined at step S1706 that the service search request packet cannot be transmitted, the process returns to step S1701, where the same process is repeated until all the search elements are divided into transmittable service search request packets.

In the exemplary embodiment, at step S1704, the search elements (finishing: staple) and (printing method: duplex) are removed from the search expression. Since the operator that concatenates the two search elements is "AND", a new search expression is generated as follows:

search expression 5=[(printing method: duplex) AND (finishing: staple)].

At step S1705, a new service search request packet is generated from this search expression 5. At step S1706, it is determined whether the size of the new generated service search request packet exceeds the maximum transmittable data size of an HTTP multicast packet using the UDP protocol. In this embodiment, since the size of the new service search request packet is less than or equal to the maximum transmittable size, the service search request packet is considered to be a second service search request packet and the process is completed.

Figure 17:
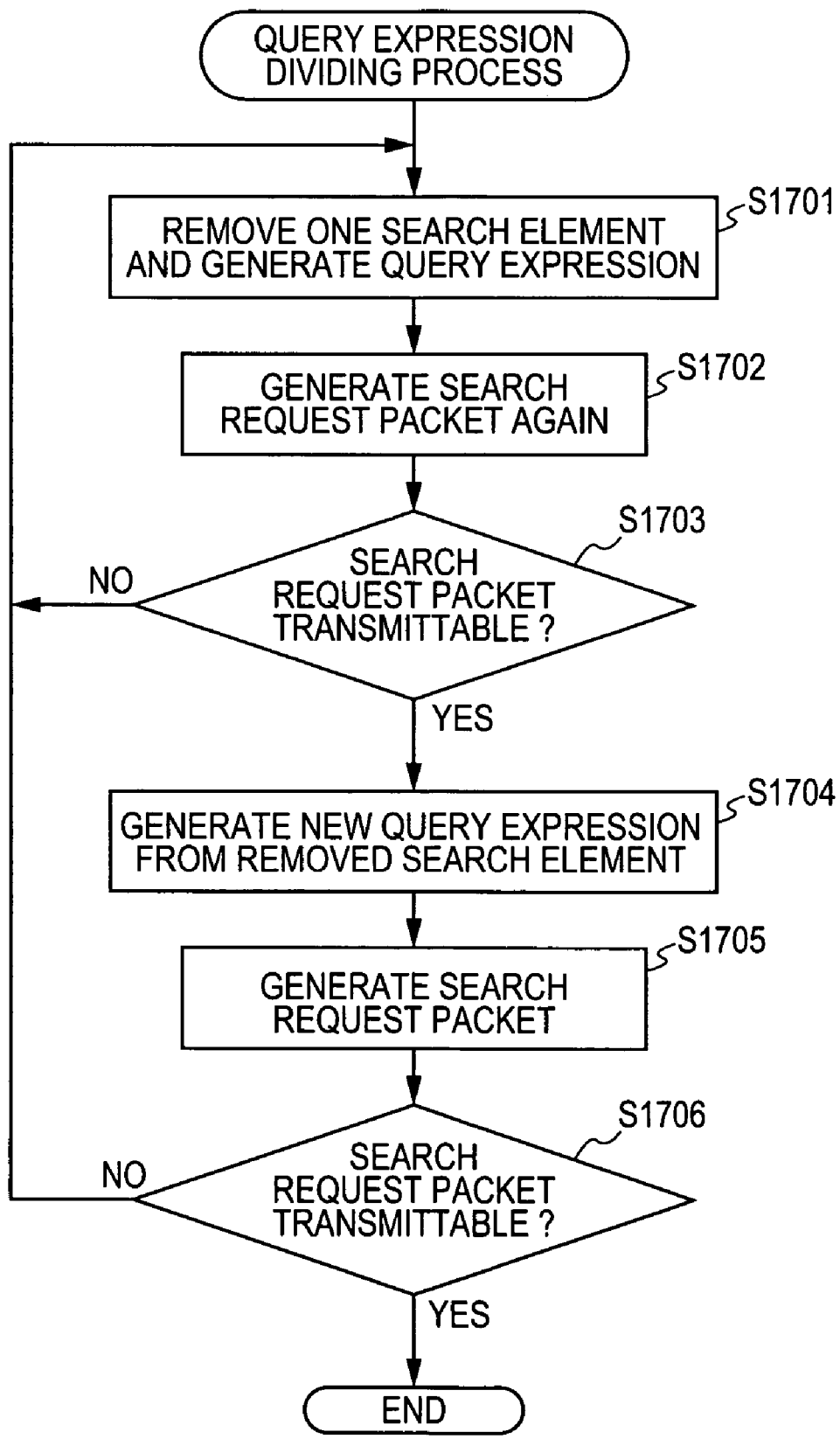
FIG. 17 is a flow chart illustrating an exemplary operation of dividing a service search request.

In the process of dividing the service search request packet shown in FIG. 17, the device information of the search elements are removed from the search expression of the original service search request one by one. When the size of the search expression becomes the transmittable size, a service search request packet based on the search expression is transmitted.

However, another method of dividing the service search request packet can be employed. That is, from the search expression "(paper size: [A4 OR A3]) AND (color printing: more than or equal to 65536 colors) AND (printing method: duplex) AND (finishing: staple)", the following five search expressions are generated:

search expression 1=paper size: A4 search expression 2=paper size: A3 search expression 3=color printing: more than or equal to 65536 colors search expression 4=printing method: duplex search expression 5=finishing: staple.

That is, a search expression is generated for each search element. A service search request packet based on each of the five search expressions is transmitted. The replied search results are merged to display printing devices that satisfy the original search expression. In this case, the computer carries out the following merge operation:

search result=[(result of search expression 1 OR result of search expression 2) AND result of search expression 3 AND result of search expression 4 AND result of search expression 5].

However, the method shown in FIG. 17 has an advantage over this method in that the number of the transmitted service search request packets is smaller and the load of merging the search results in the computer is reduced. Accordingly, the method shown in FIG. 17 can provide a superior effect.

The search expression is a search condition to search a desired device. The search expression can be composed of a plurality of search elements, or can be composed of a single search element. That is, the search expression can be a search condition and the search element can also be a search condition.

The present invention can also be achieved by supplying a storage medium (or a recoding medium) storing software program code that achieves the functions of the above-described embodiments to a system or an apparatus and by causing a computer (central processing unit (CPU) or microprocessing unit (MPU)) of the system or apparatus to read and execute the software program code. In such a case, the program code itself read out of the storage medium realizes the functions of the above-described embodiments. Therefore, the storage medium storing the program code can also realize the present invention.

Examples of the storage media for supplying the program code include a flexible disk, a hard disk, an optical disk, an magneto optical disk, a CD-ROM (compact disk-read only memory), a CD-R (CD recordable), a DVD-ROM (digital versatile disc-read only memory), a DVD-R (DVD-recordable), a magnetic tape, a nonvolatile memory card, and a ROM. Alternatively, the program code can be supplied from any other recording media, such as a storage device of a file server in a network or a storage device of an FTP (file transfer protocol) server connected to the Internet.

The functions of the above-described embodiments can also be realized by a process in which an operating system (OS) running on a computer executes some of or all of the functions in the above-described embodiments under the control of the program code read out by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-320639 filed Nov. 4, 2004, which is hereby incorporated by reference herein in its entirety.

What is claimed is:

1. An apparatus comprising:
   a processor and a memory;
   an inputting unit that facilitates inputting a search condition including a plurality of functions of a device to search for a desired device from among a plurality of devices in a network;
   a first determining unit that determines whether a size of the search condition input by the inputting unit exceeds a predetermined data size;
   a dividing unit that divides the search condition input by the inputting unit into a first search condition including a first function in the plurality of functions and a second search condition including a second function in the plurality of functions such that both of the first search condition and the second search condition do not exceed the predetermined data size, when the determining unit determines that the size of the search condition exceeds the predetermined data size;
   a transmitting unit that transmits the first search condition and the second search condition;
   a receiving unit that receives each of a first search result of the first search condition and a second search result of the second search condition;
   a second determining unit that determines a device, from among the plurality of devices in the network, which satisfies the search condition input by said inputting unit, wherein the device is determined by using both the first search result and the second search result received by the receiving unit;
   a display unit that displays the device determined by the second determining unit; and
   a third determining unit that determines whether a size of the second search condition exceeds a predetermined data size,
   wherein the second determining unit identifies, from the search condition input by the inputting unit, a relationship between the first search condition and the second search condition into which said dividing unit divides the input search condition, and determines a device which satisfies the input search condition based on the identified relationship,
   wherein the search condition includes the first function, the second function and a third function,
   and wherein the dividing unit divides the search condition input by the inputting unit into the first search condition including the first function and the second search condition including the second function and the third function,
   wherein the dividing unit divides the second search condition into the second search condition including the second function and a third search condition including the third function when the third determining unit determines that the size of the second search condition exceeds the predetermined data size.

2. The apparatus according to claim 1, wherein the transmitting unit transmits the first search condition and the second search condition to the network using multicast protocol.

3. The apparatus according to claim 1, wherein the transmitting unit transmits the first search condition and the second search condition to the network using UDP protocol.

4. A method of controlling an apparatus, comprising:
   inputting a search condition including a plurality of functions of a device to search for a desired device from among a plurality of devices in a network;
   determining whether a size of the input search condition exceeds a predetermined data size;
   dividing the search condition into a first search condition including a first function in the plurality of functions and a second search condition including a second function in the plurality of functions such that both of the first search condition and the second search condition do not exceed the predetermined data size, when it is determined that the size of the search condition exceeds the predetermined data size;
   transmitting the first search condition and the second search condition;
   receiving each of a first search result of the first search condition and a second search result of the second search condition;

determining a device, from among the plurality of devices in the network, which satisfies the input search condition, wherein the device is determined by using both the first search result and the second search result;

displaying the determined device; and determining whether a size of the second search condition exceeds a predetermined data size, wherein the determining identifies, from the input search condition, a relationship between the first search condition and the second search condition into which the dividing divides the input search condition, and determines a device which satisfies the input search condition based on the identified relationship, wherein the search condition includes the first function, the second function and a third function, and wherein dividing the input search condition into the first search condition includes the first function and dividing the input search condition into the second search condition includes the second function and the third function, wherein dividing the second search condition into the second search condition includes the second function and a third search condition including the third function when it is determined that the size of the second search condition exceeds the predetermined data size.

5. The method according to claim 4, wherein the step of transmitting the first search condition and the second search condition transmits the search condition to the network using multicast protocol.

6. The method according to claim 4, wherein the step of transmitting the first search condition and the second search condition transmits the search condition to the network using UDP protocol.

7. A computer-readable storage medium containing computer-executable instructions which cause an apparatus to search for a desired image processing apparatus connected to a network, the computer readable medium comprising:

computer-executable instructions that inputs a search condition including a plurality of functions of a device to search for a desired device from among a plurality of devices in a network;

computer-executable instructions that determine whether a size of the input search condition exceeds a predetermined data size;

computer-executable instructions that divide the search condition into a first search condition including a first function in the plurality of functions and a second search condition including a second function in the plurality of functions such that both of the first search condition and the second search condition do not exceed the predetermined data size, when it is determined that the size of the search condition exceeds the predetermined data size;

computer-executable instructions that transmit the first search condition and the second search condition;

computer-executable instructions that receive each of a first search result of the first search condition and a second search result of the second search condition;

computer-executable instructions that determine a device, from among the plurality of devices in the network which satisfies the input search condition, wherein the device is determined by using both the first search result and the second search result;

computer-executable instructions that display the determined device; and computer-executable instructions that determine whether a size of the second search condition exceeds a predetermined data size, wherein the determining identifies, from the input search condition, a relationship between the first search condition and the second search condition into which the dividing divides the input search condition, and determines a device which satisfies the input search condition based on the identified relationship, wherein the search condition includes the first function, the second function and a third function, and wherein dividing the input search condition into the first search condition includes the first function and dividing the input search condition into the second search condition includes the second function and the third function, wherein dividing the second search condition into the second search condition includes the second function and a third search condition including the third function when it is determined that the size of the second search condition exceeds the predetermined data size.

8. The apparatus according to claim 1, wherein the relationship between the first search condition and the second search condition is defined by "AND", and the second determining unit determines a device which is included in both of the first search result and the second search result received by the receiving unit.

9. The method according to claim 4, wherein the relationship between the first search condition and the second search condition is defined by "AND", and wherein determining a device, from among the plurality of devices in the network, which satisfies the input search condition using the first search result and the second search result, includes determining a device which is included in both of the first search result and the second search result.

\* \* \* \* \*